United States Patent
Hietalahti et al.

(10) Patent No.: US 8,244,244 B1
(45) Date of Patent: Aug. 14, 2012

(54) METHOD FOR TRIGGERING A USER EQUIPMENT

(75) Inventors: Hannu Hietalahti, Kiviniemi (FI); Matti Kullervo Jokimies, Salo (FI)

(73) Assignee: Renesas Mobile Corporation, Tokyo (JP)

( * ) Notice: Subject to any disclaimer, the term of this patent is extended or adjusted under 35 U.S.C. 154(b) by 0 days.

(21) Appl. No.: 13/222,320

(22) Filed: Aug. 31, 2011

(51) Int. Cl.
*H04Q 7/20* (2006.01)
(52) U.S. Cl. .................. 455/435.1; 370/332; 380/270
(58) Field of Classification Search ............. 455/435.1, 455/458, 450, 422.1; 370/328, 332; 380/270, 380/282
See application file for complete search history.

(56) References Cited

U.S. PATENT DOCUMENTS

| | | | |
|---|---|---|---|
| 2004/0253952 A1* | 12/2004 | Rager et al. ............... | 455/432.1 |
| 2005/0197120 A1* | 9/2005 | Kuchibhotla et al. ...... | 455/435.1 |

FOREIGN PATENT DOCUMENTS

| | | |
|---|---|---|
| EP | 2 265 067 A1 | 12/2010 |
| WO | WO 03/063535 A1 | 7/2003 |
| WO | WO 2011/072303 A1 | 6/2011 |

OTHER PUBLICATIONS

3GPP TS 24.301 V10.3.0 (Jun. 2011), $3^{rd}$ Generation Partnership Project; Technical Specification Group Core Network and Terminals; Non-Access-Stratum (NAS) Protocol for Evolved Packet System (EPS); Stage 3 (Release 10), (316 pages).

3GPP TS 23.401 V10.4.0 (Jun. 2011), $3^{rd}$ Generation Partnership Project; Technical Specification Group Services and System Aspects; General Packet Radio Service (GPRS) Enhancements for Evolved Universal Terrestrial Radio Access Network (E-UTRAN) Access (Release 10), (281 pages).

3GPP TS 23.060 V10.4.0 (Jun. 2011), $3^{rd}$ Generation Partnership Project; Technical Specification Group Services and System Aspects; General Packet Radio Service (GPRS); Service Description; Stage 2, (Release 10), (321 pages).

* cited by examiner

*Primary Examiner* — Phuoc Doan
(74) *Attorney, Agent, or Firm* — Harrington & Smith

(57) ABSTRACT

The invention discloses an arrangement for triggering a user equipment, wherein the user equipment is not connected to the network. In the machine type communications there is a need for reducing network activity, however, at the same time there is a need for being able to wake up a device. In the arrangement the network detaches the user equipment locally and is then triggered when needed.

20 Claims, 2 Drawing Sheets

METHOD FOR TRIGGERING A USER EQUIPMENT

FIELD OF THE INVENTION

The invention relates to machine to machine communications.

BACKGROUND OF THE INVENTION

Machine to machine communications (short M2M communications) refer to technologies wherein devices can communicate with each other. The advancement in technology has introduced a large number of different applications wherein machine to machine communications (hereinafter also called machine type communications, MTC) may be used.

Because of the wide variety of different kinds of devices standardization in the field of machine type communications has been initiated in order to provide efficient communications. A known problem arises due to large number of MTC UEs (User equipments); the number of MTC UEs may eventually be much higher than the number of the ordinary terminals. To cope with a large number of UEs in the network, the resources reserved for the MTC UEs in the network, and the signalling generated by them, need to be minimized.

Proposals for the above mentioned problem have been discussed. One proposal is to detach the UEs from the network. That is, the UEs are forced to offline state. However, these UEs still need to be triggered, even though they are not reachable by ordinary paging mechanisms. Therefore, specific trigger offline user equipments needs to be applied. The introduction of new features in 3GPP specifications impacting UEs is typically time-consuming. Therefore, the modifications should preferably such that only the network elements need to be upgraded. Alternatively, the modifications should be based on the existing 3GPP specifications. One such alternative is to use CBS (Cell Broadcast System), so that the detached UEs receive the broadcast messages, which are transparent to 3GPP specified network. These messages can contain trigger commands. A drawback of this solution is that in order to implement it in LTE devices, modifications are required to LTE (Long Term Evolution) devices specifications because CBS is not supported in the LTE. Another solution is to use MBMS (Multimedia Broadcast Multicast Services). These services may be implemented in the user equipment. However, implementing MBMS or CBS are not preferable in low cost machine type communication user equipments.

Thus, there is a need for a method where the network resources are minimized, but the implementation overhead is kept in the minimum.

SUMMARY

The invention discloses an arrangement for detaching the UE from the network, and triggering the user equipment. In machine type communications there is a need for reducing network activity. This can be done by detaching the UE from the network. However, at the same time there is a need for being able to trigger, or wake up, a device. In the arrangement the user equipment is detached from the network locally by the network and then triggered when needed.

The present invention proposes a new solution for detaching and triggering a user equipment. In such a method a user equipment is first attached to a telecommunication network. Next, when the network determines that the UE is an MTC UE, the UE is detached from the network. However, as difference to the ordinary detachment, there is no signalling between the network and the UE on the detachment. As consequence, the UE continues to operate as if it were attached to the network. Hence, the UE continues to receive also the paging messages as in the ordinary attached state. To avoid that the UE tries to make periodic location updates, the expiration of a periodic location registration timer needs to be prevented in the UE. This is done by using existing signalling.

Triggering said user equipment comprises submitting a trigger from a machine type communications server to said network, accepting said trigger in said network and submitting a paging message from said network to said user equipment, wherein said paging message comprises identification information identifying the user equipment in a manner that the paging message can be submitted. The identification information may be, for example, the subscriber identification (such as an IMSI-code) or the user equipment identification (such as an IMEI code). Because the trigger message is targeted to a detached UE, an ordinary network implementation would reject the triggering request. However, in this invention, the network accepts the triggering request, and initiates the paging procedure. In an embodiment preventing the expiration of a periodic location registration timer comprises setting very long expiration time. In an embodiment preventing said expiration of a periodic location registration timer comprises disabling said periodic location registration timer. In an embodiment preventing said expiration of a periodic location registration timer comprises setting an infinite expiration time. In an embodiment the paging message is submitted over a predetermined area. In a further embodiment the paging message is submitted during a predetermined paging window. The timing information of the paging window can be delivered from the MTC server to the network. The present invention is typically implemented in an apparatus and a system, wherein the method described above can be performed. Correspondingly the identification information may be stored in the MTC server and delivered from the MTC server to the network, however, also other servers may be used for storing this information.

A benefit of the present invention is that it allows to detach the UE from the network and enables waking up a user equipment that is in offline mode in a manner that can be implemented in a low-cost way. The invention provides a solution to the problem without need to modify the existing 3GPP specifications for the UE.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
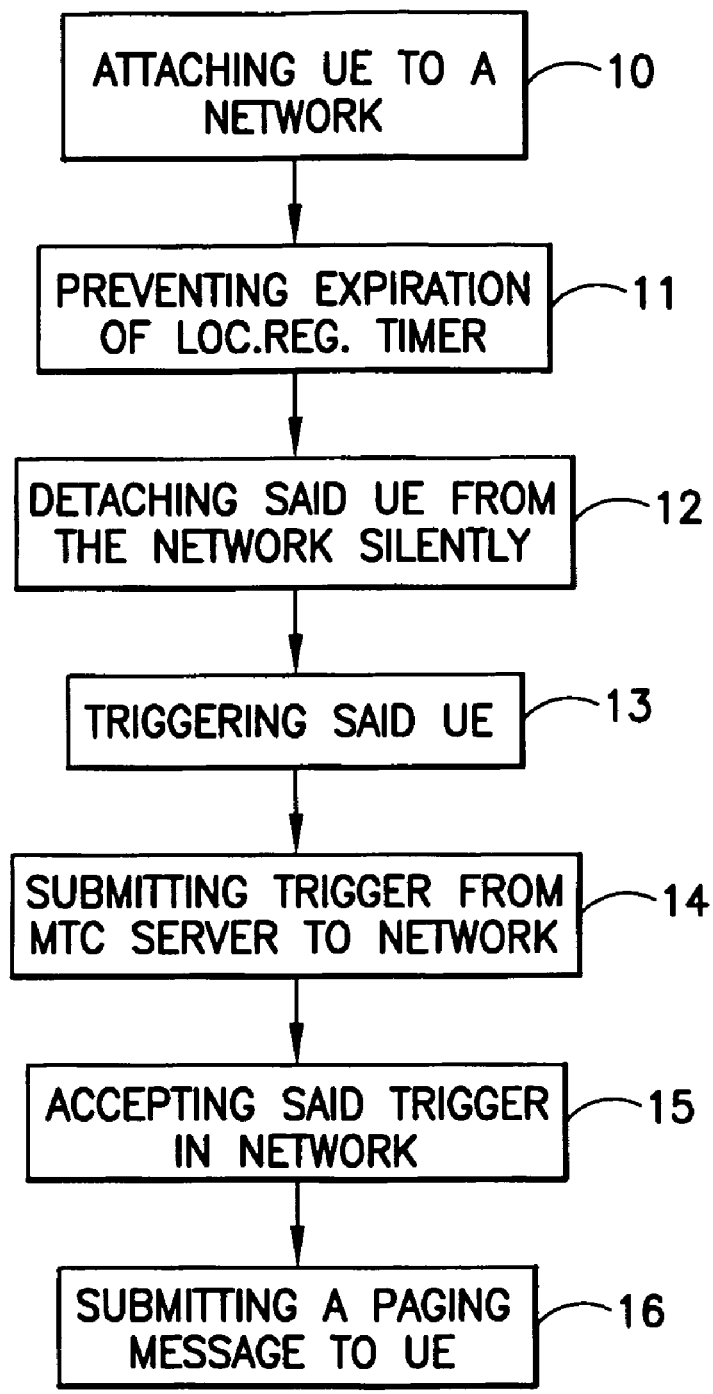
FIG. 1 is a flow chart of a method according to an embodiment of the present invention.

In FIG. 1 a flow chart of a method according to an embodiment of the present invention is disclosed. In the method the user equipment is connected to the network, step 10. The user entity may be any suitable machine type communication device, such as a mobile phone or for particular purpose designed machine type communications device. As it is desired that the user entity will have to suppress its location registration signaling, it is done in step 11. This is done, for example, by disabling location updating, routing area updating, tracking area updating and similar. These operations can be done as described, e.g. in 3GPP TS 23.060 and 3GPP TS 23.401. There may be one or more timers involved in the updating procedure. Timers can be disabled or the expiration time may be set to infinity or at least very long period that in practice means that the register is not updated. An example of very long period is a plurality of days or even weeks while the ordinary period of a conventional mobile phone is typically few hours. Then, the network detaches the user equipment from the network, step 12. This is done locally by the network, which in this context means without signaling to the user equipment. This means, that the user equipment does not know that it has been detached from the network and acts as it was attached.

When the need for triggering emerges the following triggering procedure is initiated for waking up the user equipment that has been detached from the network, step 13. The need for triggering emerges at the machine type communications server side, wherein the server is running software or a service that has a need to contact the user entity. In this case the server sends a trigger request to the network, step 14. Contrary to the current network implementations, the network accepts the trigger, step 15, even if it knows that the user equipment is not attached to the network.

Because the UE is detached from the network, the location of the UE is not known in the network. Because this mechanism is optimally applied only to stationary MTC UEs, the location of the UE is known by the MTC server. The MTC server may deliver the location of the UE to the network with the trigger message.

Finally, the user equipment is paged, step 16. The paging is done for example in accordance with the procedure explained in the standard 3GPP TS 24.301, wherein an IMSI-paging is discussed as an abnormal procedure used for error recovery in the network. In PS domain the UE will consider IMSI paging as request to synchronise the protocol states between the UE and the network, and the UE performs a local detach, followed by attach. After the attach, the UE makes the session or call setup. The paging procedure is performed over a predetermined area during predetermined paging period, which is maintained by machine type communications interworking function. Because the UE is considered detached by the network, the information of its location is not known by the network. This can be overcome by the fact that the MTC UEs utilizing the invented mechanism are stationary, and the location is known by the MTC server. The location of the UE can be delivered from the MTC server to the network with the triggering message.

In an alternative embodiment, instead of signalling the periodic location update timer value as 'infinity', the period of UEs could be set to 'infinity' by default, or programmed on application layer. If the operator wants to change this, then signaling is needed from the network to the user equipment. The operator may set a subscriber specific period, or may command the UEs to use the ordinary, broadcast system information based period. This could be done so that the MTC server delivers to the network the information on the MTC UEs, which have this behaviour. Another advantage of this solution is that it is not necessary to modify the 3GPP UE specifications, but the operation could be done as UE implementation (however, UE conformance test requirements may not be met).

Figure 2:
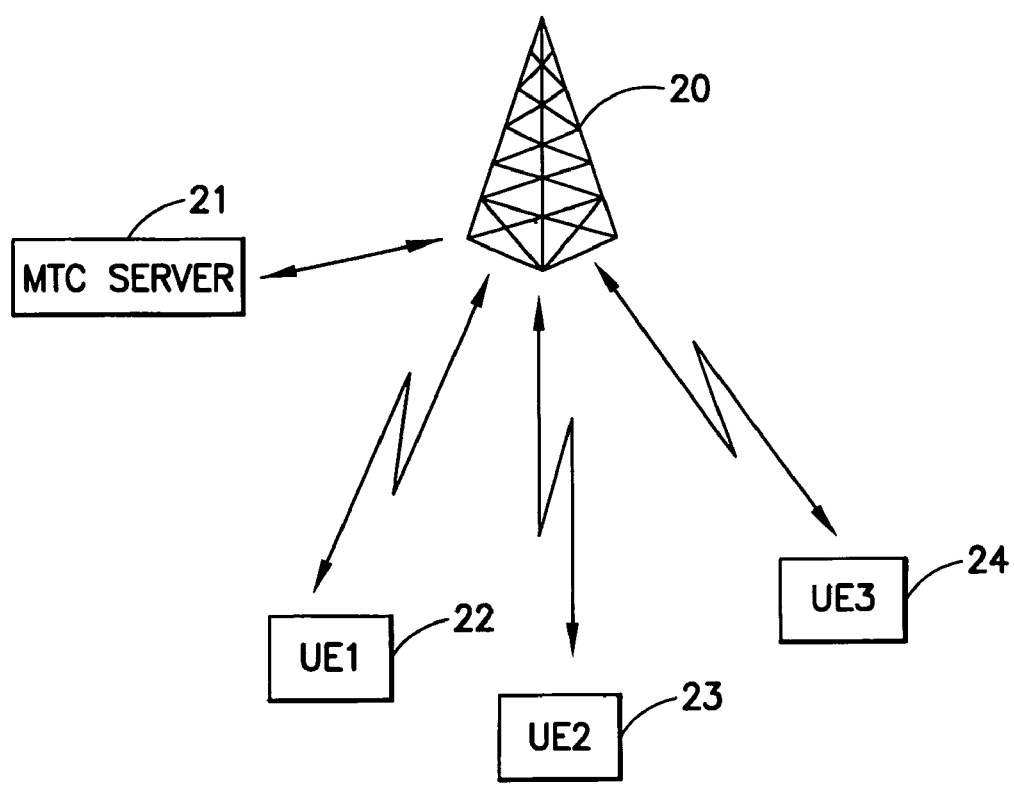
FIG. 2 is a block diagram of an example embodiment of the present invention.

FIG. 2 is a block diagram of an example embodiment of the present invention. In the figure network is illustrated by the base station 20. The MTC server 21 is communicating with one or more user equipments 22-24 through the base station 20. The MTC server does not know if the user equipments 22-24 are attached to the base station or not.

In a further embodiment a safety mechanism against the user equipment and network getting out of synchronization could be designed. For example, if MTC interworking function needs to be reset and the timing information for specific user equipment is lost because of that.

The exemplary embodiments of user equipment can include, for example, any suitable servers, workstations, PCs, laptop computers, personal digital assistants (PDAs), Internet appliances, handheld devices, cellular telephones, smart phones, wireless devices, other devices, and the like, capable of performing the processes of the exemplary embodiments. The devices and subsystems of the exemplary embodiments can communicate with each other using any suitable protocol and can be implemented using one or more programmed computer systems or devices.

One or more interface mechanisms for the interface between devices (for example, between UE and base station, or MTC server and base station) can be used with the exemplary embodiments, including, for example, Internet access, telecommunications in any suitable form (e.g., voice, modem, and the like), wireless communications media, and the like. For example, employed communications networks or links can include one or more wireless communications networks, cellular communications networks, 3G communications networks, LTE communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware and/or software art(s). For example, the functionality of one or more of the components of the exemplary embodiments can be implemented via one or more hardware and/or software devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be conveniently implemented using one or more general purpose processors, microprocessors, digital signal processors, micro-controllers, and the like, programmed according to the teachings of the exemplary embodiments of the present inventions, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

Stored on any one or on a combination of computer readable media, the exemplary embodiments of the present inventions can include software for controlling the components of the exemplary embodiments, for driving the components of the exemplary embodiments, for enabling the components of the exemplary embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the exemplary embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present inventions can be distributed for better performance, reliability, cost, and the like.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, trans-mission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

The invention claimed is:

1. A method comprising:
   attaching a user equipment to a telecommunication network;
   preventing expiration of a periodic location registration timer;
   detaching said user equipment from said network locally by said network;
   triggering said user equipment, wherein the triggering comprises:
   submitting a trigger from a machine type communications server to said network;
   accepting said trigger in said network;
   submitting a paging message from said network to said user equipment, wherein said paging message comprises identification information for providing the paging message to the user equipment.

2. The method according to claim 1, wherein preventing said expiration of a periodic location registration timer comprises setting very long expiration time.

3. The method according to claim 1, wherein preventing said expiration of a periodic location registration timer comprises disabling said periodic location registration timer.

4. The method according to claim 1, wherein preventing said expiration of a periodic location registration timer comprises setting infinite expiration time.

5. The method according to claim 1, wherein the submitting said paging message over predetermined area.

6. The method according to claim 1, wherein the submitting said paging message during predetermined paging window.

7. An apparatus comprising a wireless telecommunication module for communicating, a memory for storing program code and a processor for executing program code, wherein the apparatus is configured to
   attach a user equipment to a telecommunication network;
   prevent expiration of a periodic location registration timer;
   detach said user equipment from said network locally;
   trigger said user equipment, wherein said apparatus is in triggering process further configured:
   receive a trigger from a machine type communications server to said network;
   accept said trigger in said network;
   submit a paging message from said network to said user equipment, wherein said paging message comprises identification information for providing the paging message to the user equipment.

8. The apparatus according to claim 7, wherein said apparatus is configured to prevent said expiration of a periodic location registration timer by setting very long expiration time.

9. The apparatus according to claim 7, wherein said apparatus is configured to prevent said expiration of a periodic location registration timer comprises by disabling said periodic location registration timer.

10. The apparatus according to claim 7, wherein said apparatus is configured to prevent said expiration of a periodic location registration timer comprises by setting infinite expiration time.

11. The apparatus according to claim 7, wherein said apparatus is configured to submit said paging message over predetermined area.

12. The apparatus according to claim 7, wherein apparatus is configured to submit said paging message during predetermined paging window.

13. The apparatus according to claim 7, wherein the apparatus is a network element.

14. The apparatus according to claim 7, wherein the apparatus is an eNodeB of an LTE-network.

15. A system comprising:
- at least one user equipment;
- at least one machine type communications server
- at least one network element; wherein the system is further configured to:
- attach a user equipment to a telecommunication network;
- prevent expiration of a periodic location registration timer of the user equipment;
- detach said user equipment from said network locally by said network by said network;
- trigger said user equipment, wherein said network element is in triggering process further configured:
- receive a trigger from a machine type communications server to said network;
- accept said trigger in said network;
- submit a paging message from said network to said user equipment, wherein said paging message comprises identification information for providing the paging message to the user equipment.

16. The system according to claim 15, wherein said network element is configured to prevent said expiration of a periodic location registration timer by signaling a very long or infinite expiration time to said at least one user equipment.

17. The system according to claim 15, wherein said network element is configured to prevent said expiration of a periodic location registration timer comprise disabling said periodic location registration timer by signaling from said network element to said at least one user equipment.

18. The system according to claim 15, wherein said network element is configured to submit said paging message over predetermined area.

19. The system according to claim 15, wherein the network element is configured to submit said paging message during predetermined paging window.

20. The system according to claim 15, wherein the system is an LTE-network.

* * * * *